United States Patent
Yokoyama (10) Patent No.: US 8,627,129 B2
(45) Date of Patent: Jan. 7, 2014

(54) DATA PROCESSING APPARATUS, CONTROL METHOD, AND STORAGE MEDIUM

(75) Inventor: Junnosuke Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/975,325

(22) Filed: Dec. 21, 2010

(65) Prior Publication Data

US 2011/0161704 A1     Jun. 30, 2011

(30) Foreign Application Priority Data

Dec. 28, 2009    (JP) ................................. 2009-297380

(51) Int. Cl.
     *G06F 1/32*      (2006.01)

(52) U.S. Cl.
     USPC ............................. 713/323; 713/320; 713/502

(58) Field of Classification Search
     USPC ......................................................... 713/323
     See application file for complete search history.

(56) References Cited

U.S. PATENT DOCUMENTS

| | | | |
|---|---|---|---|
| 2005/0125651 A1* | 6/2005 | Ehrlich | 713/2 |
| 2009/0177905 A1* | 7/2009 | Igari | 713/323 |
| 2010/0153760 A1* | 6/2010 | Gupta et al. | 713/323 |

FOREIGN PATENT DOCUMENTS

JP      2000-184106 A     6/2000

* cited by examiner

*Primary Examiner* — Dennis M Butler
(74) *Attorney, Agent, or Firm* — Carter, DeLuca, Farrell & Schmidt LLP (57) ABSTRACT

A data processing apparatus includes a storage unit and operates in a first power mode in which power that the storage unit can operate is supplied to the storage unit or in a second power mode in which power that the storage unit can operate is not supplied to the storage unit. The data processing apparatus includes an input unit configured to input data, a storing unit configured to store the data in the storage unit, a setting unit configured to set waiting time for making the data processing apparatus wait to shift from the first power mode to the second power mode according to a storage destination if the data is stored in the storage unit, and a control unit configured to shift the data processing apparatus from the first power mode to the second power mode when the waiting time elapses after the data is stored in the storage unit.

9 Claims, 9 Drawing Sheets

|  | PRINTABLE | DOCUMENT | VARIOUS KINDS |
|---|---|---|---|
|  | pdf, jpg, tif, xps | xls, doc, ppt, txt | exe, bat, others |
| SHARED REGION | POSSIBLE | POSSIBLE | POSSIBLE |
| PRIVATE REGION | POSSIBLE | POSSIBLE | POSSIBLE |
| TMP REGION | INHIBITION | INHIBITION | INHIBITION |

FIG.4B

|  | PRINTABLE | DOCUMENT | VARIOUS KINDS |
|---|---|---|---|
|  | pdf, jpg, tif, xps | xls, doc, ppt, txt | exe, bat, others |
| SHARED REGION | POSSIBLE | IMPOSSIBLE | IMPOSSIBLE |
| PRIVATE REGION | POSSIBLE | POSSIBLE | POSSIBLE |
| TMP REGION | INHIBITION | INHIBITION | INHIBITION |

|  | PRINTABLE | DOCUMENT | VARIOUS KINDS |
|---|---|---|---|
|  | pdf, jpg, tif, xps | xls, doc, ppt, txt | exe, bat, others |
| SHARED REGION | 120 min | 60 min | 30 min |
| PRIVATE REGION | 60 min | 30 min | 15 min |
| TMP REGION | 0 min | 0 min | 0 min |

FIG.7

|  | PRINTABLE | DOCUMENT | VARIOUS KINDS |
|---|---|---|---|
|  | pdf, jpg, tif, xps | xls, doc, ppt, txt | exe, bat, others |
| SHARED REGION | · PRINT OUTPUT<br>· DATA DELETION | · DATA DELETION | · DATA DELETION |
| PRIVATE REGION | · PRINT OUTPUT<br>· DATA DELETION<br>· DATA COPY | · DATA DELETION<br>· DATA COPY | · DATA DELETION<br>· DATA COPY |

FIG.8

DATA PROCESSING APPARATUS, CONTROL METHOD, AND STORAGE MEDIUM

BACKGROUND OF THE INVENTION

1. Field of the Invention

The present invention relates to a data processing apparatus, a control method, and a storage medium.

2. Description of the Related Art

In a conventional data processing apparatus, for example, Japanese Patent Application Laid-Open No. 2000-184106 discusses a technique of controlling time to shift to a power saving mode to extend according to a connection state to a network or a public line, and an preceding operation. Further, in a recent data processing apparatus, a data access function has been added, in which a part of a region in a data storage unit in the apparatus, e.g., a hard disk (hereinafter referred to as HDD), is opened to a user as a storage region of arbitrary data and the user can access the data from an apparatus connecting to a network.

However, the HDD and a control system used in the data storage unit require more than ten seconds to recover from a power saving mode and to allow access to the data storage unit. For enabling a user to immediately access a data storage unit whenever he/she wants, it is desired to shorten the time required for recovering from the power saving mode. Thus, for enabling the user to immediately access a data storage unit whenever he/she wants, a process control, for example, to inhibit the apparatus from shifting to the power saving mode, or to shift to the power saving mode which does not reduce a power supply to the HDD and the control system, is performed Therefore, in such apparatus, the user can not immediately access the data storage medium whenever he/she wants to access, or for responding to a user request, even if the apparatus shifts to the power saving mode, the apparatus needs to maintain a state in which relatively high power is supplied. When a power consumption of the apparatus is reduced more, convenience of a user has been sacrificed.

SUMMARY OF THE INVENTION

The present invention relates to a data processing apparatus capable of further reducing power consumption of the apparatus while maintaining convenience of a user.

According to an aspect of the present invention, a data processing apparatus including a storage unit and operating in a first power mode in which power that the storage unit can operate is supplied to the storage unit or in a second power mode in which power that the storage unit can operate is not supplied to the storage unit includes an input unit configured to input data, a storing unit configured to store the data in the storage unit, a setting unit configured to set waiting time for making the data processing apparatus wait to shift from the first power mode to the second power mode according to a storage destination if the data is stored in the storage unit, and a control unit configured to shift the data processing apparatus from the first power mode to the second power mode when the waiting time elapses after the data is stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
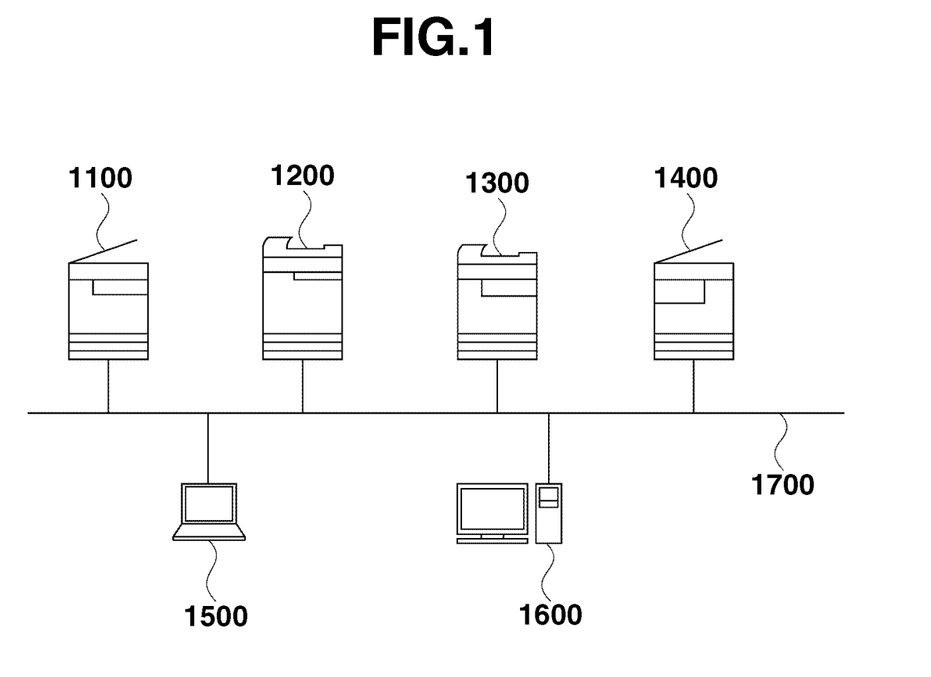
FIG. 1 illustrates a system configuration using an image processing apparatus.

FIG. 1 illustrates a system configuration using a data processing apparatus according to an exemplary embodiment of the present invention. In the present exemplary embodiment, the data processing apparatus is described as an image processing apparatus, more specifically, a printing apparatus including a printing function. A printing apparatus 1100 of the present invention is connected to a network 1700, and can transmit and receive data to and from other image processing apparatuses 1200, 1300, and 1400 and personal computers (PC) 1500 and 1600.

Figure 2:
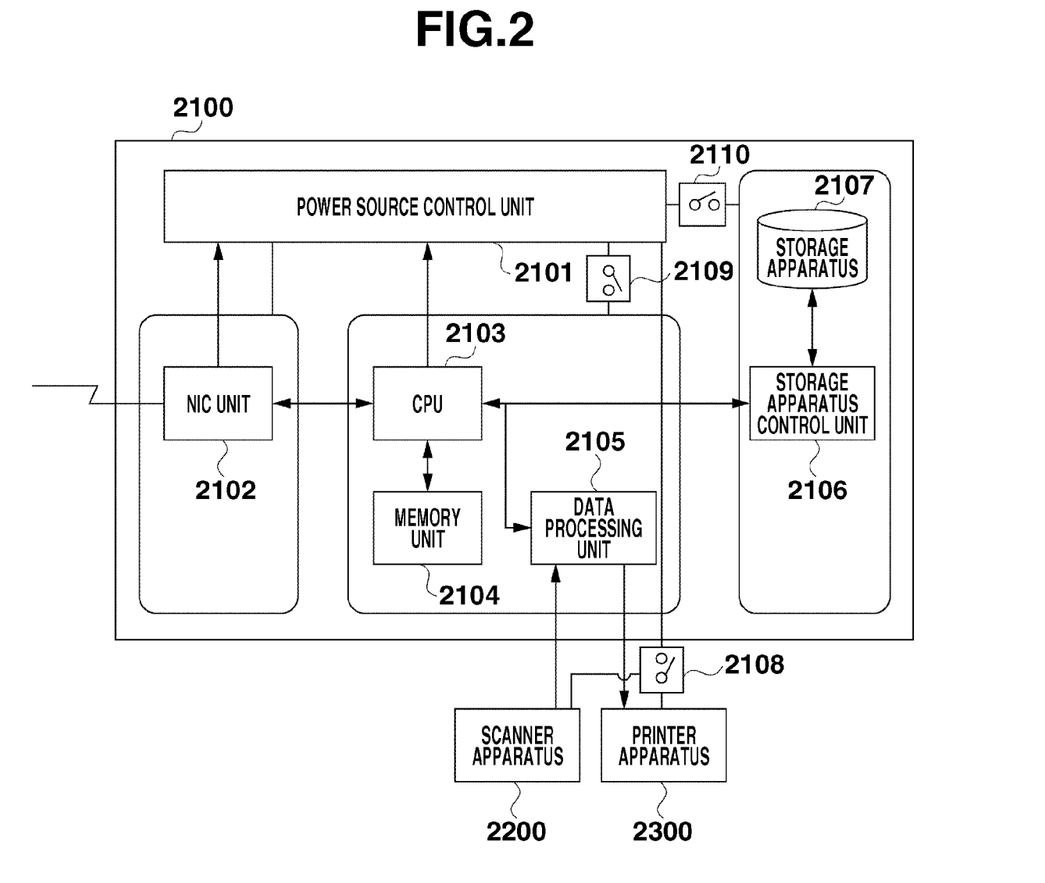
FIG. 2 illustrates an internal configuration of the image processing apparatus.

FIG. 2 illustrates an internal configuration of the printing apparatus 1100. Data received from a network to a network interface card (NIC) unit 2102 is processed using a central processing unit (CPU) 2103 and a memory unit 2104, and stored in a storage apparatus 2107 controlled by a storage apparatus control unit 2106. Data that can be stored in the storage apparatus 2107 is not only data with an image file format which can be printed by the printing apparatus 1100 but also data with a document format which is not printable but can be processed by a connected PC. The storage apparatus 2107 can store a plurality of pieces of these data.

The image file format that can be printed by the printing apparatus 1100 may include, for example, portable document format (pdf), joint photographic experts group (jpg), tag image file format (tif), and extensible markup language (XML) paper specification (xps). Document formats which are not printable but can be processed by a PC may include a format for, Microsoft Office Excel (xls), Microsoft Word (doc), Microsoft PowerPoint (ppt), and a text file (txt). Further, executable file (exe) and batch file (bat) are also included. Unique format data read by a scanner apparatus 2200 and processed by a data processing unit 2105 is also stored in the storage apparatus 2107 controlled by the storage apparatus control unit 2106. The data stored in the storage apparatus 2107 can be transmitted from the NIC unit 2102 to a device connected to a network via the CPU 2103 and the memory unit 2104.

The printing apparatus 1100 has a plurality of power saving modes. If the apparatus is not used more than a predetermined time length, a power source control unit 2101 controls a switch 2108 and stops supplying power to the scanner apparatus 2200 and a printer apparatus 2300. If a state that the apparatus is not used further continues more than a predetermined time length, the power source control unit 2101 controls a switch 2109 and also stops supplying power to the CPU 2103, the memory unit 2104, and the data processing unit 2105. If the state that the apparatus is not used still further continues more than a predetermined time length, the power source control unit 2101 controls a switch 2110 and also stops supplying power to the storage apparatus control unit 2106 and the storage apparatus 2107.

The NIC unit 2102 is constantly supplied with the power, and can receive print data and data with a document format which can be processed by a PC to the printing apparatus 1100 in the power saving state. The NIC unit 2102 which received the data from the network in the power saving state analyzes a network packet and transmits a signal to the power source control unit 2101. The power source control unit 2101 which received the signal controls any one of the switches 2108 to 2110 for restarting the power supply to apparatuses which are necessary for processing.

Figure 3:
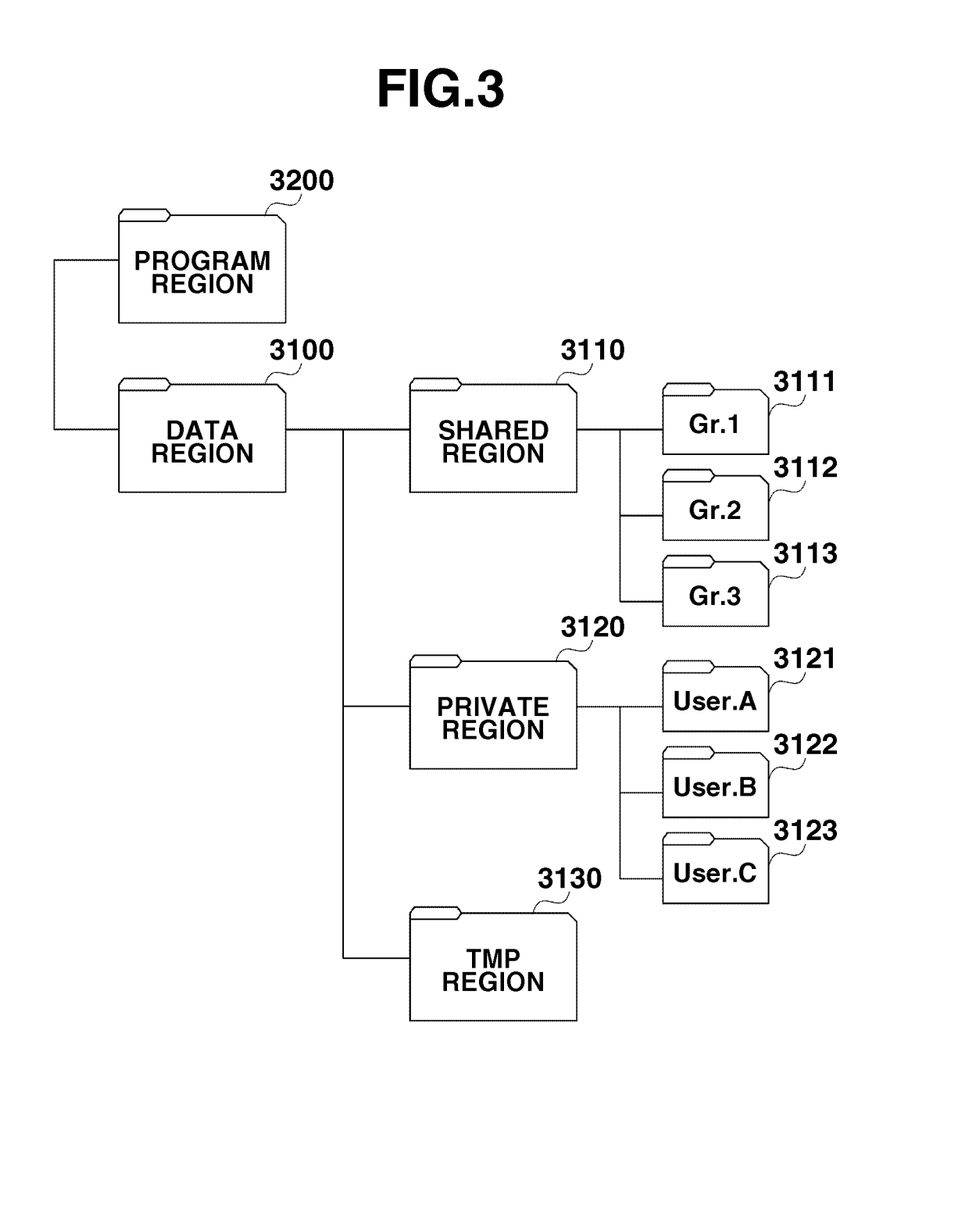
FIG. 3 illustrates a folder structure in a storage apparatus.

FIG. 3 illustrates a folder structure of an inside of the storage apparatus 2107. The folder structure in the storage apparatus 2107 is classified into a program region 3200 and a data region 3100. The program region 3200 does not allow data write access via a network in principle. The data region 3100 is divided into a shared region 3110, a private region 3120, and a temporary region 3130. The shared region 3110 is a region which can be shared with a plurality of users. The private region 3120 is a region which can be used by only a specific user. The shared region 3110 and the private region 3120 allow data read access and data write access via a network. On the other hand, the temporary region 3130 does not allow data read access and data write access via a network. Because the temporary region 3130 is used as a region to temporarily store data required for a printing process.

In the present exemplary embodiment, the shared region 3110 can be subdivided into a group 1 region 3111, a group 2 region 3112, and a group 3 region 3113. The private region 3120 can be subdivided into a user A region 3121, a user B region 3122, and a user C region 3113. The shared region 3110 and the private region 3120 can store the data with the printable image file format, the data with the document format which is not printable but can be processed by the PC connected with the apparatus, and data other than a document. Hereinbelow, the data with the printable image file format will be referred to as printable data, and the data with the document format which is not printable but can be processed by the connected PC will be referred to as document data.

Figure 4A:
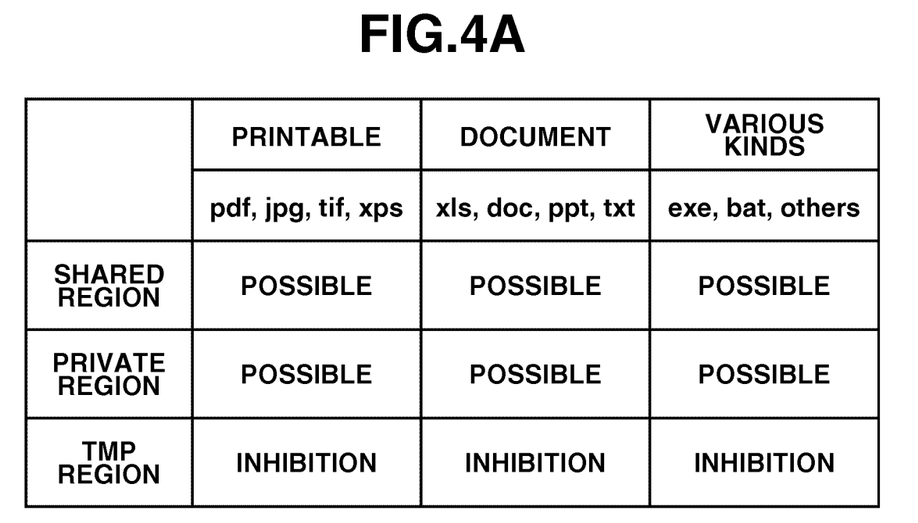
FIGS. 4A and 4B are tables illustrating examples of setting of data which can be stored in each folder.
Figure 4B:
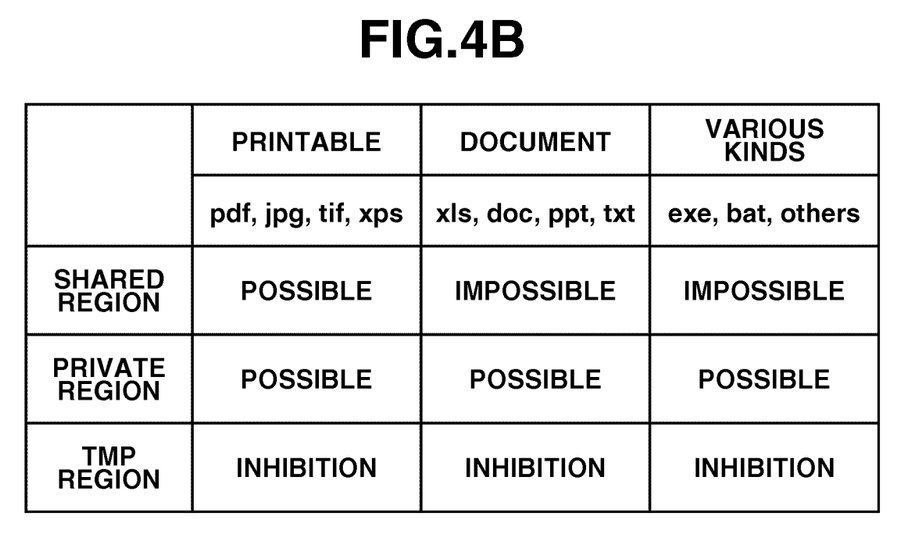

FIGS. 4A and 4B are tables illustrating these pieces of data. The printing apparatus 1100 can set which folder in the storage apparatus 2107 is allowed to store which type of data. FIG. 4A illustrates a case in which the printing apparatus 1100 allows all folders to store all types of data. On the other hand, FIG. 4B illustrates a case in which the printing apparatus 1100 does not allow the shared folder to store the document data and various types of data other than the document data. When the printing apparatus 1100 stores storable data whose type is set in FIGS. 4A and 4B in the shared region 3110 or the private region 3120, the printing apparatus 1100 performs shift processing to a power saving mode according to a flow illustrated in FIGS. 5A and 5B. The CPU 2103 executes the processing illustrated in the flowchart in FIGS. 5A and 5B according to a program stored in the storage apparatus 2107.

Figures 5, 5A:
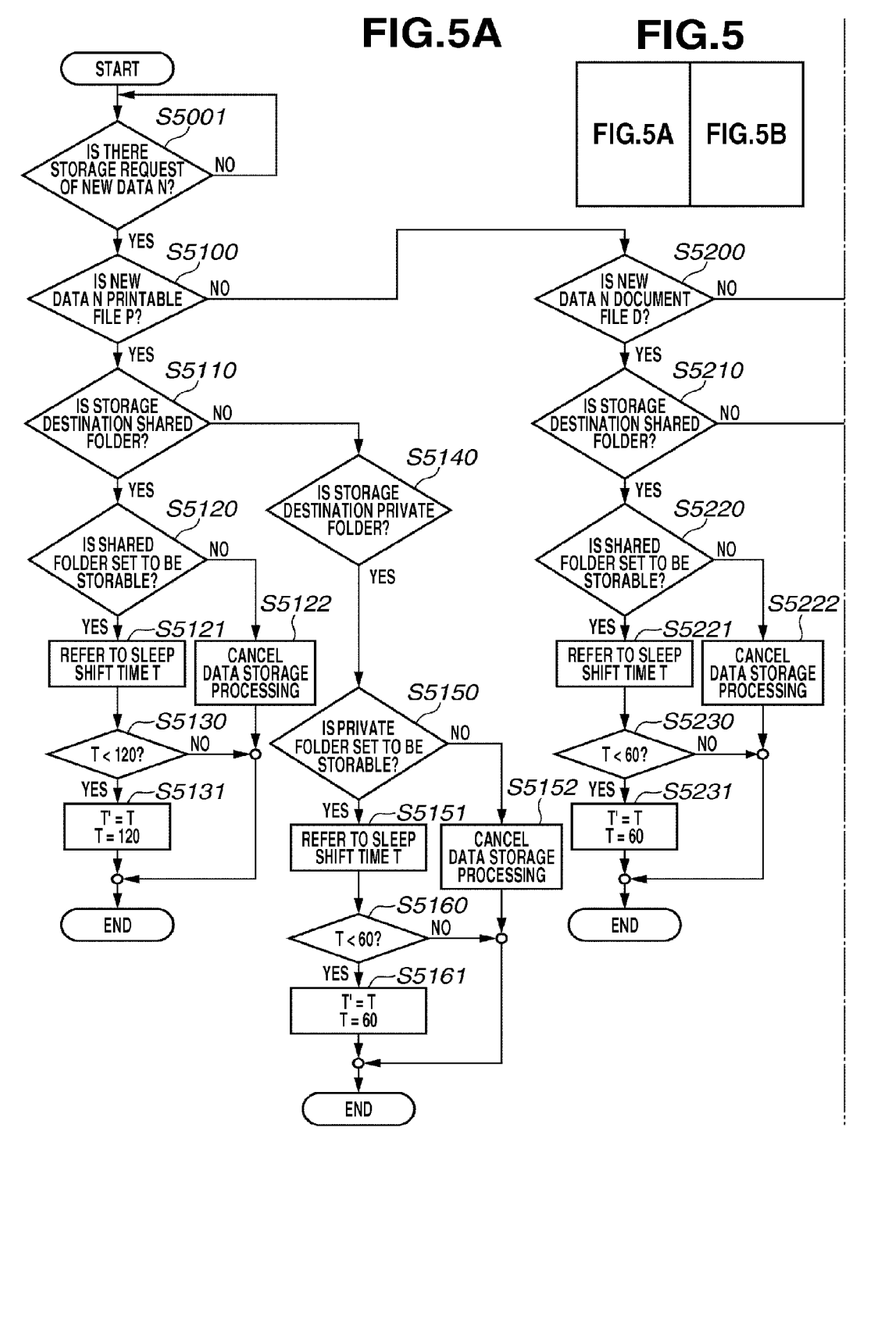
FIGS. 5A and 5B are a flowchart illustrating power saving shift processing.

In step S5001, when there is a storage request of a new data N received by the NIC unit 2102 to the storage apparatus 2107 (YES in step S5001), the CPU 2103 executes the following processing. More specifically, the CPU 2103 determines a type of a file by determining an extension of the new data N.

In step S5100, the CPU 2103 determines whether a determination result of the type of the file is a printable file P. If the file type is the printable file P (YES in step S5100), then in step S5110, the CPU 2103 determines whether to store the printable file P in a region corresponding to the shared folder 3110 in the storage apparatus 2107.

If a storage destination of the file P is a region corresponding to the shared folder (YES in step S5110), then in step S5120, the CPU 2103 determines whether the region is set to be able to store the file P. When the CPU 2103 determines that the region is set to allow storing the file P (YES in step S5120), the CPU 2103 executes the following processing. In step S5121, the CPU 2103 refers to sleep shift time T. In step S5130, the CPU 2103 determines whether the sleep shift time T is less than 120 minutes. The sleep shift time T is less than 120 minutes means that a value less than 120 minutes has been already set to the sleep shift time T, or one or more seconds elapsed after setting the value.

If the sleep shift time T is less than 120 minutes (YES in step S5130), in step S5131, the CPU 2103 sets a current value of the sleep shift time T to shift time backup T', and sets 120 minutes to the sleep shift time T. According to the setting, the printing apparatus 1100 can certainly secure time until shifting to a sleep state for 120 minutes. A reason why the sleep shift time T is set to 120 minutes is that the file is the printable file and is stored in the shared folder. In this case, since the printable file P is stored in the shared folder, a possibility of being accessed by various users is high and a possibility of being printed is also very high. Thus, time for the apparatus to shift to the power saving mode is set to the longest value.

If storage of the printable file P in the shared folder is not set to be allowed (NO in step S5120), then in step S5122, the CPU 2103 cancels storing the printable file P and the printing apparatus 1100 terminates the processing of this flowchart.

When the CPU 2103 determines that the storage destination of the printable file P is not the shared folder (NO in step S5110), in step S5140, the CPU 2103 determines whether the storage destination of the printable file P is the private folder. When the storage destination of the printable file P is the private folder (YES in step S5140), in step S5150, the CPU 2130 determines whether the private folder 3120 is set to be able to store the printable file P. If the CPU 2103 determines that the private folder is set to be able to store the printable file P (YES in step S5150), then in step S5151, the CPU 2103 refers the sleep shift time T. In step S5160, the CPU 2103 determines whether the sleep shift time T is less than 60 minutes. When the sleep shift time T is less than 60 minutes (YES in step S5160), the CPU 2103 sets the sleep shift time T to 60 minutes.

When the sleep shift time T is extended to 60 minutes, in step S5161, the CPU 2103 sets a current value of the sleep shift time T to the shift time backup T'. According to this setting, the printing apparatus 1100 can certainly secure a time until shifting to the sleep state for 60 minutes. A reason why the sleep shift time T is set to 60 minutes is that the file is the printable file and is stored in the private folder. In this case, since the printable file P is stored in the private folder, a possibility of being accessed by various users is low but a possibility of being printed is very high. Thus, the time for the apparatus to shift to the power saving mode is set to a relatively long value.

The shift time backup T' is used as follows. When predetermined data stored in the private folder is deleted before the sleep shift time T elapses, the CPU 2103 clears a sleep shift time timer T at the time of deleting the data. Therefore, the printing apparatus 1100 can shift to the power saving mode without waiting elapse of the set sleep shift time T.

However, such control may cause a problem in a following case. More specifically, if another piece of printable data M is stored in the shared folder one minute before when the new data N is stored, when the printing apparatus 1100 shifts to the sleep state because the new data N is deleted, a user cannot refer to the data M. The shift time backup T' is used to avoid such a problem. This processing will be described below.

In the present exemplary embodiment, data deletion is not only processing to completely delete the stored data. Instead of actually deleting the stored data, processing to set the stored data not to be readable is equivalent to substantially deleting the stored data, and such processing is also included in the data deletion.

Figure 5B:
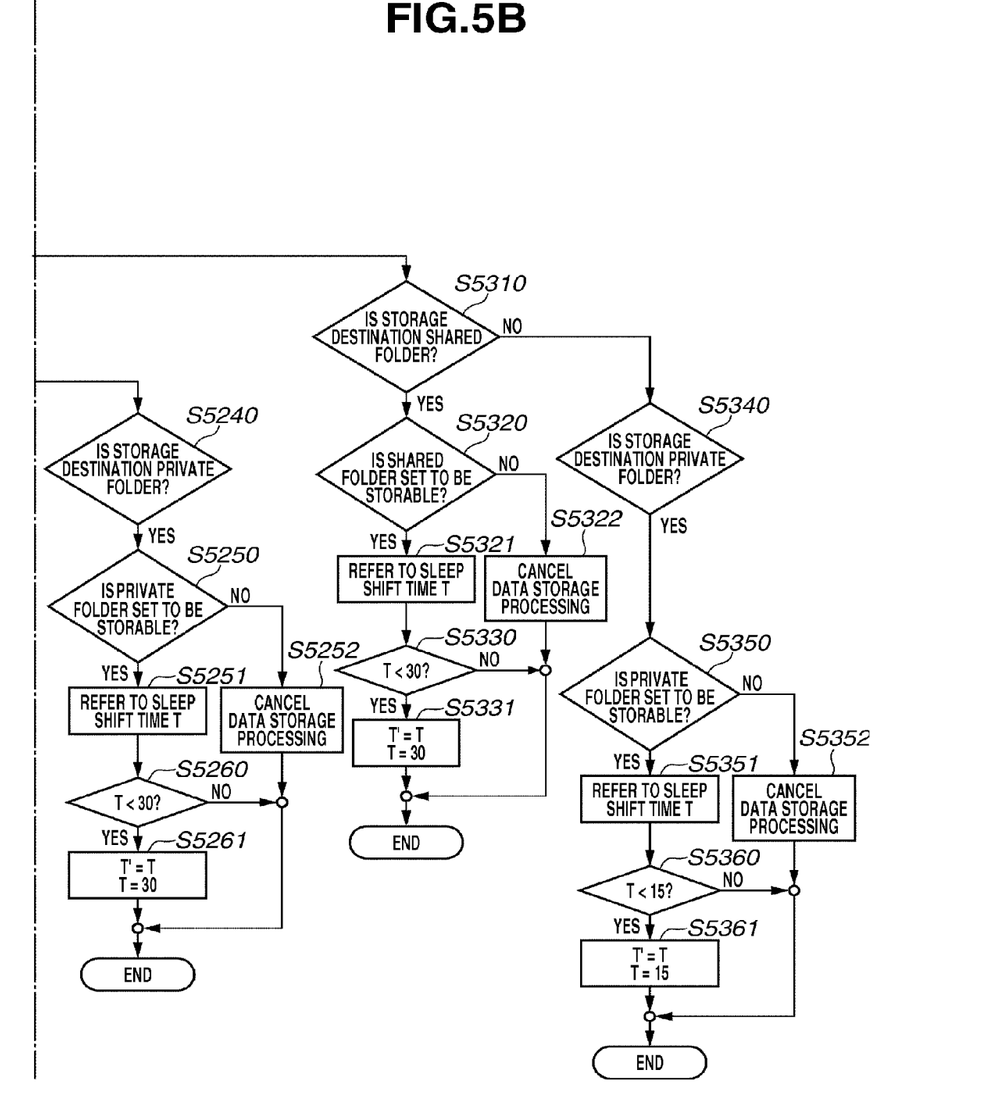

When the new data N is not a printable file (NO in step S5100), in step S5200, the CPU 2130 determines whether the new data N is a document file. If the new data N is a document file D (YES in step S5200), then in step S5210, the CPU 2103 similarly determines whether a storage destination is the shared folder 3110. When the storage destination is the shared folder (YES in step S5210), in step S5220, the CPU 2103 determines whether the shared folder is set to be able to store the document file D. When the shared folder is set to be able to store the document file D (YES in step S5220), in step S5221, the CPU 2103 refers to the sleet shift time T according to the table illustrated in FIG. 6. If the sleep shift time T is less than 60 minutes (YES in step S5230), then in step S5231, the CPU 2103 sets the sleep shift time T to 60 minutes.

When the shared folder is not set to be able to store the document file D (NO in step S5220), in step S5222, the CPU 2103 cancels storing the document file D, and the printing apparatus 1100 terminates the processing of this flowchart.

A reason why the sleep shift time T is set to 60 minutes is that although the document file D is stored in the shared folder, the document file D is not a printable file. More specifically, since the document file D has a high possibility of being accessed by various users but is not printable, the time for the apparatus to shift to the power saving mode is set to be relatively long but shorter than the time when the file is the printable file stored in the shared folder.

On the other hand, if the storage destination of the document file D is not the shared folder (No in step S5210), then in step S5240, the CPU 2103 determines whether the storage destination of the document file D is the private folder 3120. Similarly, when the storage destination is the private folder (YES in step S5240), in step S5250, the CPU 2103 determines whether the private folder is set to be allowed to store the document file D. If the private folder is set to be allowed to store the document file D (YES in step S5250), then in step S5251, the CPU 2103 refers to the sleet shift time T according to the table illustrated in FIG. 6. When the sleep shift time T is less than 30 minutes (YES in step S5260), in step S5261, the CPU 2103 sets the sleep shift time T to 30 minutes, and sets a value of the current sleep shift time T to the shift time backup T'.

If the private folder is not set to be allowed to store the document file D (NO in step S5250), then in step S5252, the CPU 2103 cancels storing the document file D, and the printing apparatus 1100 terminates the processing of this flowchart.

A reason why the sleep shift time T is set to 30 minutes is that although the document file D is stored in the private folder, the document file D is not a printable file. More specifically, since the document file D has a low possibility of being accessed by various users and is not printable, the time for the apparatus to shift to the power saving mode is set shorter than the time when the file is the printable file stored in the private folder.

Similarly, when the new data N is not the document file D (NO in step S5200), in step S5310, the CPU 2103 determines whether the storage destination is the shared folder 3110. In steps S5310 and S5340, the CPU 2103 determines whether the storage destination is the shared folder or the private folder. Then, in steps S5320 and S5350, the CPU 2103 determines whether the file is set to storable in the folder of the storage destination.

Figure 6:
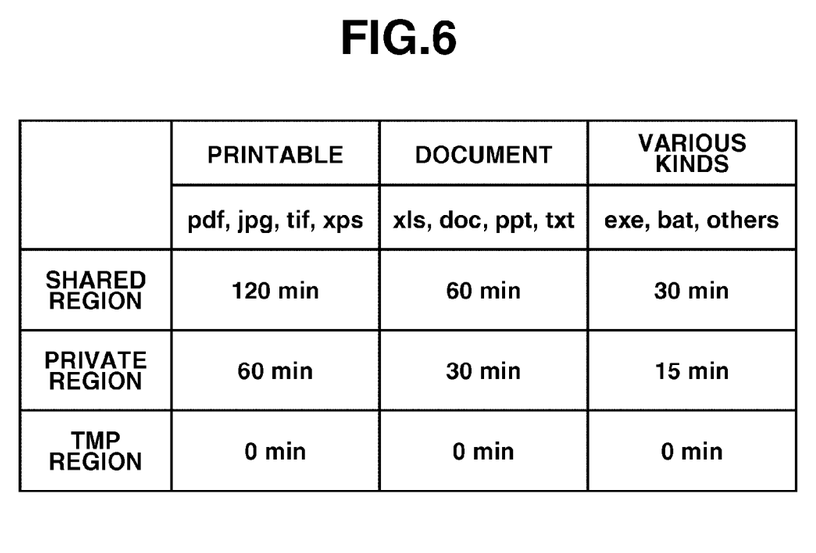
FIG. 6 is a table illustrating sleep shift time T.

If the file is set to storable in the folder (YES in step S5320, and YES in step S5350), then steps S5321 and S5351, the CPU 2103 refers to the sleep shift time T (30 minutes or 15 minutes, respectively) according the table illustrated in FIG. 6. In steps S5330 and S5360, the CPU 2103 determines whether the sleep shift time T is less than the value shown in the table in FIG. 6. If the sleep shift time T is less than the value shown in the table of FIG. 6 (YES in step S5330 and YES in step S5360), in steps S5331 and S5361, the CPU 2103 sets the time T acquired from the table in FIG. 6 as the sleep shift time T, and sets a value of the current sleep shift time T to the shift time backup T', respectively.

A reason why the sleep shift time T is set to 30 minutes when the file is stored in the shared folder is that although the file is stored in the shared folder, the file is not a printable file or a document file. More specifically, since the file is not a printable file or a document file, namely the file is not an ordinary document file, a person who refers the file is limited. Thus, when the file is stored in the private folder, the CPU 2103 sets a further shorter time as the sleet shift time T.

In the present exemplary embodiment, the value of the sleep shift time T is determined according to the table illustrated in FIG. 6, but the present invention is not limited to this configuration. The sleep shift time T can be properly changed depending on an application of a folder, a use application of a file, or a using method by a user.

When the sleep shift T and the shift time backup T' are set, the CPU 2103 starts counting a timer. After the sleep shift time T or the shift time backup T' elapses, the CPU 2103 shifts the printing apparatus 1100 to the sleep state.

Figure 8:
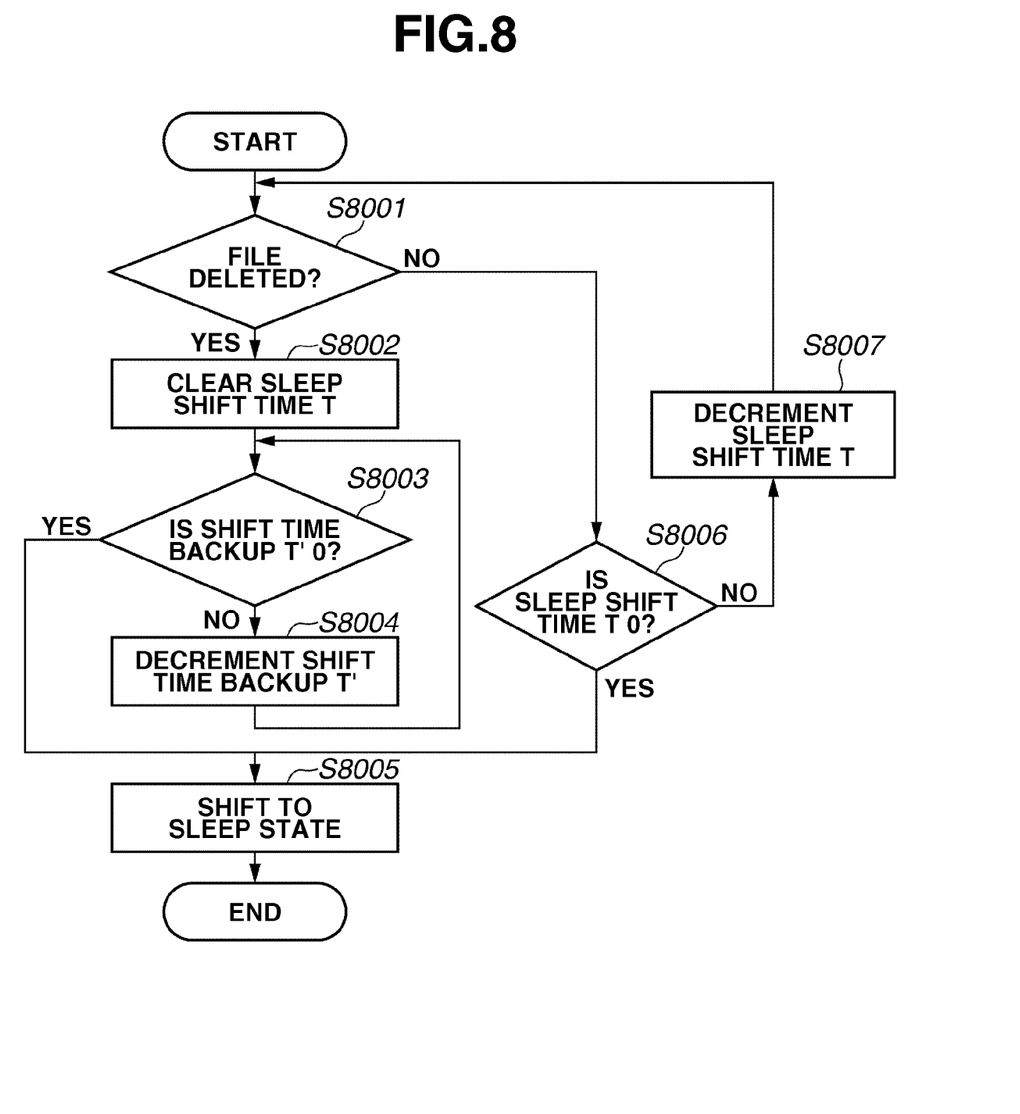
FIG. 8 is a flowchart illustrating processing executed when a file is deleted.

Then, FIG. 8 will be described. FIG. 8 is a flowchart illustrating processing executed when a file is deleted. The CPU 2103 executes the processing illustrated in flowchart in FIG. 8 according to a program stored in the storage apparatus 2107.

In step S8001, the CPU 2103 determines whether a file stored in the storage apparatus 2107 is deleted.

When the file is deleted (YES in step S8001), in step S8002, the CPU 2103 clears a value of the sleep shift time T. Further, in step S8003, the CPU 2103 determines whether the shift time backup T' is zero. The shift time backup T' is a timer to secure time for referring to a file which is stored before the deleted file is stored. In other word, the shift time backup T' is a timer to secure time for referring to a file which is not deleted. When the shift time backup T' does not elapse (NO in step S8003), in step S8004, the CPU 2103 decrements the shift time backup T'. When the shift time backup T' is zero (YES in step S8003), in step S8005, the CPU 2103 shifts the printing apparatus 1100 to the sleep state.

On the other hand, if the file is not deleted (NO in step S8001), then in step S8006, the CPU 2103 determines whether the sleep shift time T elapses. When the sleep shift time T is not zero (NO in step S8006), in step S8007, the CPU 2103 decrements the sleep shift time T. When the sleep shift time T is zero (YES in step S8006), in step S8005, the CPU 2103 shifts the printing apparatus 1100 to the sleep state.

According to the above described control, when there is a file other than the deleted file, the printing apparatus 1100 can certainly secure the time to shift to the sleep state illustrated in FIG. 6.

In the present exemplary embodiment, the sleep shift time T and the shift time backup T' are counted by decrementing the timer. However, the present invention is not limited to this method. The time can be measured by incrementing the count of the timer. By executing the processing illustrated in the flowcharts in FIGS. 5 and 8, when new data is stored in the shared folder or the private folder, the CPU 2103 can set the sleep shift time T illustrated in FIG. 6. The time T illustrated in FIG. 6 can be changed, and a user can set the time T.

When the above described data storage processing is completed, the CPU 2103 in the printing apparatus 1100 counts up a real time rock (RTC) (not illustrated), and decrements values of the sleep shift time T and the shift time backup T' for every minute. When the sleep shift time T becomes zero, the CPU 2103 instructs the power source control unit 2101 to stop power supply to each unit.

Figure 7:
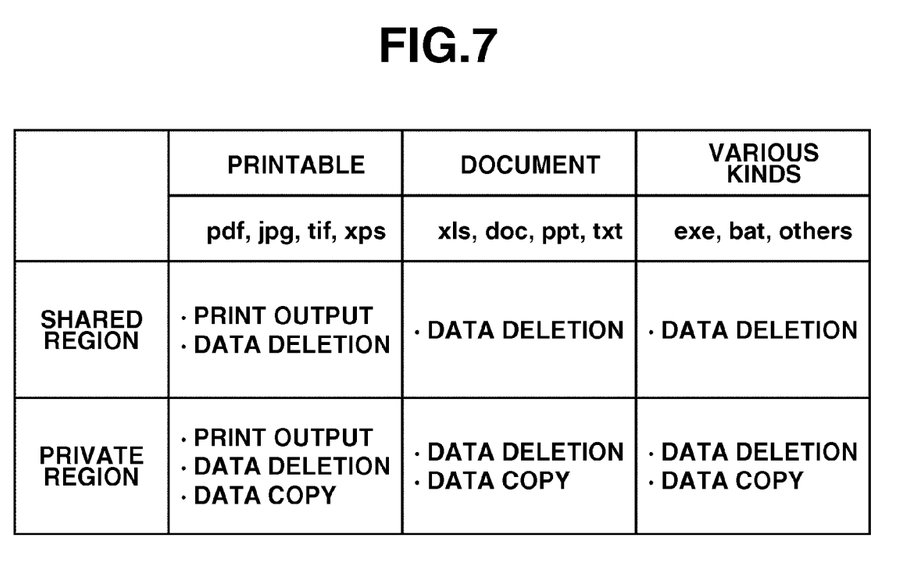
FIG. 7 is a table illustrating specific operations that can clear sleep shift time T.

After storing new data in the storage apparatus 1207, when access of a specific operation to the stored data occurs in the storage apparatus 2107 before the sleep shift time T elapses, the printing apparatus 1100 clears the sleep shift time T. FIG. 7 illustrates an example to set a specific operation to clear the sleep shift time T. For example, when printable data is stored in the private region, the sleep shift time T is set to 60 minutes based on the setting in FIG. 6. When the stored printable data is deleted within 60 minutes after storing the data, the printing apparatus 1100 can shift to the power saving mode when the data is deleted.

A concrete example of processing when a plurality of pieces of data is stored will be described below. The printing apparatus 1100 receives, from the PC 1500 connected to the network, a request to store document data in the user A region 3121 in the private region 3120 of the storage apparatus 2107. At this time, the printing apparatus 1100 is in the power saving mode, and the sleep shift time T is set to zero.

The CPU 2103 sets the shift time backup T' to zero, and the sleep shift time T to 30 minutes according to the flowchart in FIGS. 5A and 5B and the table in FIG. 6. Simultaneously, the storage apparatus control unit 2106 stores the document data in the user A region 3121. The CPU 2103 starts counting up the RTC, and decrements the sleep shift time T and the shift time backup T' according to time elapse after storing data.

It is assumed that the printing apparatus 1100 receives, from the PC 1600 connected to the network, a request to store new printable data in the group 1 region 3111 in the shared region 3110 of the storage apparatus 2107 after elapsing 20 minutes. At this time, the shift time backup T' is zero minute, and the sleep shift time T is ten minutes. The CPU 2103 sets the shift time backup T' to ten minutes, and the sleep shift time T to 120 minutes according to the flowchart in FIGS. 5A and 5B. Simultaneously, the storage apparatus control unit 2106 stores the printable data in the group 1 region 3111.

It is assumed that the printing apparatus 1100 receives a request to print the stored printable data one minute later. At this time, the shift time backup T' is nine minutes, and the sleep shift time T is 119 minutes. When the printing apparatus 1100 prints the printable data and normally ends the printing, the printable data is deleted. When the printable data is deleted, the CPU 2103 sets the sleep shift time T to nine minutes which is the shift time backup T', and decrements the value of the shift time backup T'. More specifically, the CPU 2103 does not shift the printing apparatus 1100 to the power saving mode for remaining nine minutes, so that the printing apparatus 1100 can secure accessing time determined in the table in FIG. 6 for the document initially stored in the user A region 3121.

In the present exemplary embodiment, a single CPU executes the processing illustrated in flowcharts in FIGS. 5 and 8. However, the present invention is not limited to this configuration. A plurality of CPUs can execute the processing illustrated in the flowcharts by distributing the processing among the CPUs.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-297380 filed Dec. 28, 2009, which is hereby incorporated by reference herein in its entirety.

What is claimed is:

1. A data processing apparatus including a storage unit and operating in a first power mode in which power is supplied to the storage unit or in a second power mode in which power is not supplied to the storage unit, the data processing apparatus comprising:
    an input unit configured to input data;
    a setting unit configured to set a first waiting time in a case where a storage destination of the data input by the input unit is a first area of the storage unit, and to set a second waiting time in a case where a storage destination of the data input by the input unit is a second area of the storage unit; and
    a control unit configured to shift the data processing apparatus from the first power mode to the second power mode when the first waiting time or the second waiting time set by the setting unit elapses after the data is stored in the storage unit.

2. The data processing apparatus according to claim 1, wherein the setting unit sets:
    (1) the first waiting time in a case where a storage destination of the data input by the input unit is the first area of the storage unit and a type of the data is a first type,
    (2) the second waiting time in a case where a storage destination of the data input by the input unit is the second area of the storage unit and a type of the data is the first type,
    (3) a third waiting time in a case where a storage destination of the data input by the input unit is the first area of the storage unit and a type of the data is the second type, and
    (4) a fourth waiting time in a case where a storage destination of the data input by the input unit is the second area of the storage unit and a type of the data is the second type.

3. The data processing apparatus according to claim 1, wherein the control unit shifts the data processing apparatus from the first power mode to the second power mode without waiting for the first waiting time or the second waiting time if the data stored in the storage unit is deleted.

4. The data processing apparatus according to claim 1, wherein the first area of the storage unit is a shared folder that is shared by a plurality of users and the second area of the storage unit is a private folder that only a specific user accesses.

5. The data processing apparatus according to claim 4, wherein the setting unit sets the first waiting time is to be longer than the second waiting time.

6. The data processing apparatus according to claim 2, wherein the first type of the data is usable for printing by the data processing apparatus, and the second type of the data is unusable for printing by the data processing apparatus.

7. The data processing apparatus according to claim 6, wherein the setting unit sets the first waiting time to be longer than the third waiting time.

8. A method for controlling a data processing apparatus including a storage unit and operating in a first power mode in which power is supplied to the storage unit or in a second power mode in which power is not supplied to the storage unit, the method comprising:
   inputting data;
   setting a first waiting time in a case where a storage destination of the input data is a first area of the storage unit;
   setting a second waiting time in a case where a storage destination of the input data is a second area of the storage unit; and
   shifting the data processing apparatus from the first power mode to the second power mode when the first waiting time or the second waiting time elapses after the data is stored in the storage unit.

9. A storage medium storing a program for causing a data processing apparatus including a storage unit and operating in a first power mode in which power is supplied to the storage unit or in a second power mode in which power is not supplied to the storage unit to execute processing comprising:
   inputting data;
   setting a first waiting time in a case where a storage destination of the input data is a first area of the storage unit;
   setting a second waiting time in a case where a storage destination of the input data is a second area of the storage unit; and
   shifting the data processing apparatus from the first power mode to the second power mode when the first waiting time or the second waiting time elapses after the data is stored in the storage unit.

* * * * *